(12) United States Patent
Park

(10) Patent No.: US 11,777,078 B2
(45) Date of Patent: *Oct. 3, 2023

(54) SILICON CARBON COMPOSITE POWDER ACTIVE MATERIAL

(71) Applicant: Enevate Corporation, Irvine, CA (US)

(72) Inventor: Benjamin Park, Irvine, CA (US)

(73) Assignee: Enevate Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/675,411

(22) Filed: Feb. 18, 2022

(65) Prior Publication Data

US 2022/0173380 A1     Jun. 2, 2022

Related U.S. Application Data

(63) Continuation of application No. 16/679,140, filed on Nov. 8, 2019, now Pat. No. 11,258,058.

(51) Int. Cl.
*H01M 4/1395* (2010.01)
*H01M 10/0525* (2010.01)
*H01M 4/1393* (2010.01)

(52) U.S. Cl.
CPC ....... *H01M 4/1395* (2013.01); *H01M 4/1393* (2013.01); *H01M 10/0525* (2013.01)

(58) Field of Classification Search
CPC .................................................. H01M 4/1395
See application file for complete search history.

(56) References Cited

U.S. PATENT DOCUMENTS

| | | | |
|---|---|---|---|
| 2011/0236758 A1 | 9/2011 | Takahashi et al. | |
| 2014/0166939 A1 | 6/2014 | Park et al. | |
| 2017/0040602 A1 | 2/2017 | Ha et al. | |
| 2017/0222219 A1* | 8/2017 | Sun ........................ | H01M 4/386 |
| 2018/0323425 A1 | 11/2018 | Choi et al. | |
| 2019/0214640 A1* | 7/2019 | Salem ................... | H01M 4/587 |
| 2020/0006759 A1 | 1/2020 | Ay et al. | |

OTHER PUBLICATIONS

International Preliminary Report on Patentability, PCT/US2020/058204, dated May 19, 2022, 9 pages.
International Search Report, International Application No. PCT/US2020/058204, dated Feb. 4, 2021.

* cited by examiner

*Primary Examiner* — Brian R Ohara
(74) *Attorney, Agent, or Firm* — McAndrews, Held & Malloy, Ltd.

(57) ABSTRACT

Systems and methods for generating silicon carbon composite powder that have the electrical properties of thicker, active material silicon carbon composite films or carbon composite electrodes, and may include a cathode, an electrolyte, and an anode, where the electrodes may include silicon carbon composite powder.

11 Claims, 6 Drawing Sheets

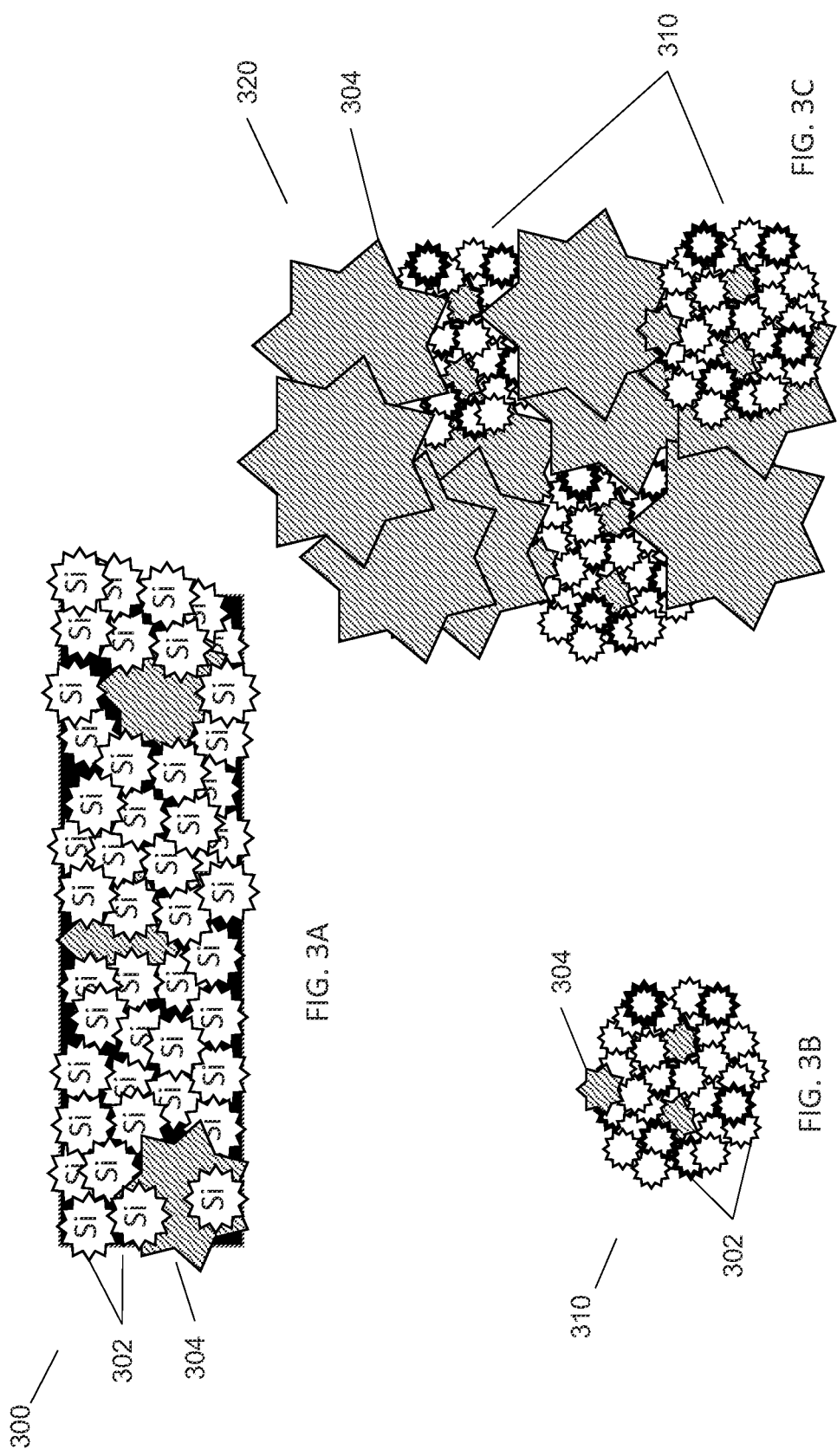

SILICON CARBON COMPOSITE POWDER ACTIVE MATERIAL

CROSS-REFERENCE TO RELATED APPLICATIONS/INCORPORATION BY REFERENCE

This application is a continuation of and claims the benefit of U.S. application Ser. No. 16/679,140 filed Nov. 8, 2019, pending (now allowed). The entirety of the above referenced application is hereby incorporated by reference.

FIELD

Aspects of the present disclosure relate to energy generation and storage. More specifically, certain embodiments of the disclosure relate to a method and system for generating silicon carbon composite powder that have electrical properties of thicker, active material silicon carbon composite films or carbon composite electrodes.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for providing silicon carbon composite powder at microparticle-scale sizes, cells comprising the silicon carbon composite powder, and electrodes comprising the silicon carbon composite powder, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 3A-3C illustrate electrode active materials, in accordance with example embodiments of the disclosure. FIG. 3A depicts a typical silicon dominant silicon carbon active material film. FIG. 3B depicts an example embodiment of a silicon carbon composite powder in accordance with the disclosure. FIG. 3C depicts an example embodiment that incorporates silicon carbon composite powders, as described herein, into in-line processes that are used to generate electrode active materials in accordance with example embodiments of the disclosure.

DETAILED DESCRIPTION

Figure 1:
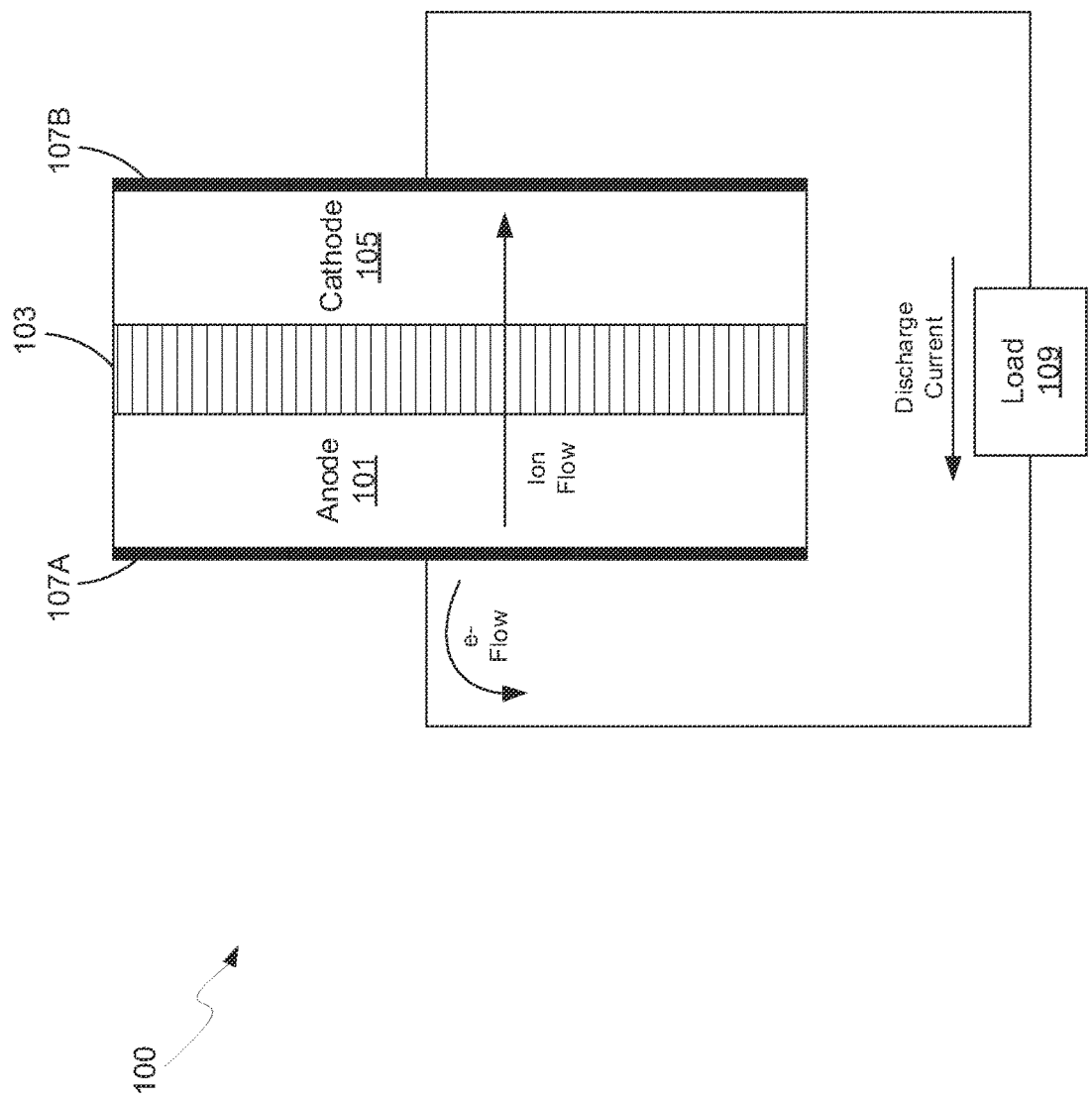
FIG. 1 is a diagram of a battery with anode expansion configured via silicon particle size, in accordance with an example embodiment of the disclosure.

FIG. 1 is a diagram of a battery including a silicon carbon composite powder, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

The disclosure provides a solution to the challenges developing in the art relating to limitations of material applications of currently available active materials arising from the physical limits in the size, shape and scale of existing active material films and commercially available electrodes. Much of the developing battery technology is seeking to try to incorporate powder-based active materials in its batteries. In example embodiments, the disclosure provides silicon carbon composite powder comprising silicon and graphite particles with a substantially smaller size $D_{50}$ distribution relative to the particles used in the manufacture of active material films and composite electrodes. Thus, the disclosure provides electrode active material in the form of silicon carbon composite powders, wherein the particle size $D_{50}$ distribution of the active material composite powder is on the order of microns (e.g., from about 5 um to less than 25 um) and allows for more application flexibility when compared to existing active material films (about 30 thick, or more) and commercial composite electrodes (about 100-250 um thick). The flexibility provided by the size of the silicon carbon composite powder allows for their use as drop-in replacement materials in existing cell fabrication processes.

Figure 2:
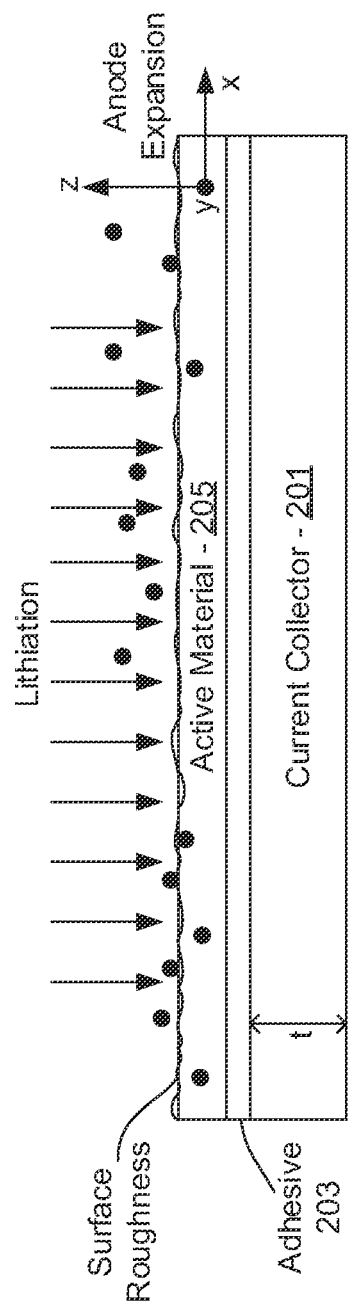
FIG. 2 illustrates anode expansion during lithiation, in accordance with an example embodiment of the disclosure.

FIG. 2 illustrates anode expansion during lithiation, in accordance with an example embodiment of the disclosure. Referring to FIG. 2, there are shown a current collector 201, an optional adhesive 203, and an active material 205. It should be noted that the adhesive 203 may or may not be present depending on the type of anode fabrication process utilized, as the adhesive is not necessarily there in a direct coating process where the active material is formed directly on the current collector. In an example scenario, the active material 205 comprises silicon particles in a binder material and a solvent, the active material 205 being pyrolyzed to turn the binder into a pyrolytic carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 6 µm, such as 10 µm or 20 µm for copper, for example, while thinner foils may be less than 6 µm thick in copper.

In another example scenario, when the current collector 201 is thinner, on the order of 5-6 µm for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 µm nickel foil current collectors, very low expansion and no cracking results. Furthermore, different alloys of metals may be utilized to obtain desired thermal conductivity, electrical conductivity, and tensile strength, for example.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

Figure 3D:
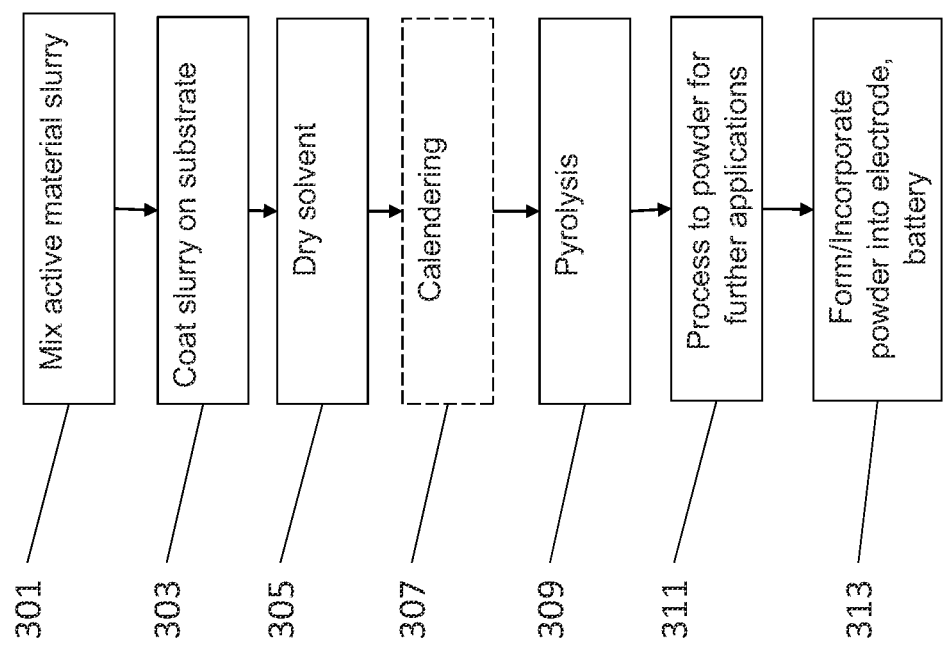
FIG. 3D is an example embodiment of a flow diagram for a process for preparing the silicon carbon composite powder

FIGS. 3A-3D illustrate example embodiments of the silicon carbon composite powder, the incorporation of those composite powders into electrode active materials, and flow process diagram for preparing the silicon carbon composite powder. FIG. 3A depicts a typical silicon dominant active material film 300, approximately 25-40 um thick, with silicon particles 302 and optional graphite particles 304 bound by pyrolytic carbon that may be generated by pyrolysis of precursor (e.g., binder) after mixing (e.g., in a slurry). In the illustrated active film in FIG. 3A, the silicon particles 302 and the graphite particles 304 may have $D_{50}$ size distributions of about 7 um and about 10-15 um, respectively. Pyrolytic carbon is depicted throughout FIGS. 3A, 3B, and 3C as black background as well as black outline on the silicon 302 and graphite 304 particles. FIG. 3B depicts an example embodiment of a silicon carbon composite powder 310, in accordance with the disclosure. In the depicted example embodiment the silicon 302 and the graphite 304 particles have $D_{50}$ size distributions that are smaller (for example, from about 0.1 um to about 1.0 um) than the particles shown in FIG. 3A. The reduced particle sizes of the silicon and graphite particles (302 and 304 in FIG. 3B) provide for the manufacture and production of the silicon carbon composite particles 310, as described herein, that may be sized on a scale of any commercially available graphite (e.g., less than about 25 um, or from about 2 um to about 15 um or 5 um to about 12 um). FIG. 3C depicts an example that incorporates the example embodiment of the silicon carbon composite particles 310 into a conventional thicker (e.g., 100-250 um) graphite-based electrode 320 that may comprise graphite particles 304 and the composite particles 310. As described herein, the $D_{50}$ distribution particle size of the silicon carbon composite powder can be modified, and different particle sizes may be combined to provide bimodal or multimodal $D_{50}$ particle size distributions. FIG. 3D depicts an example process flow that may be used to prepare the silicon carbon composite powder in accordance with the description.

Preparation of the Silicon Carbon Composite Powder.

As depicted in FIG. 3D, the disclosure provides an example embodiment of a process method that may be used in the preparation of the silicon carbon composite powder as described herein. Referring to the example process illustrated in FIG. 3D, a mixture of silicon particles, polymer precursor, and optionally a conductive carbon (e.g., graphite, carbon blacks, carbon fibers, carbon nanofibers, carbon nanotubes, or the like) 301 is prepared. The mixture may be prepared as a slurry that can be coated, or applied to and spread over a substrate to a desired thickness 303. The slurry may be dried to remove some or all of any solvent 305 that may be present. In step 307, an optional calendering process may be utilized where a series of hard pressure rollers may be used to smooth and/or provide a denser sheet of material, or to aid in forming a film prior to pyrolysis. In step 309, the mixture may be reacted under conditions that pyrolyze the precursor to convert the precursor to a conductive carbon phase (i.e., pyrolytic carbon). In example embodiments, the dried film may be pyrolyzed by heating to 500-800° C. or alternatively, to about 900° C. to about 1350° C., such that carbon precursors are partially or completely converted into pyrolytic carbon. The pyrolysis step may result in an electrode (e.g., anode) active material having silicon content greater than or equal to 50% by weight, which has been subjected to heating at or above 400° C. The pyrolysis reaction may be performed under a reducing atmosphere (e.g., an inert atmosphere, a vacuum and/or flowing argon, nitrogen, or helium gas).

As an alternative example embodiment to the process described in FIG. 3D, the mixed slurry 301 may be taken directly to pyrolysis 309, which may comprise a pyrolysis technique such as, for example, spray pyrolysis. Spray pyrolysis may comprise aerosolizing a slurry into droplets, wherein the slurry comprises solid particles in a precursor solution, evaporating solvent(s) from the droplets, and calcining the dried droplets to decompose precursor compounds into pyrolytic carbon forming product particles. Upon formation, particles may be collected from the pyrolysis gas stream.

After pyrolysis, the resulting silicon carbon composite material can be milled, ground, and/or processed to form the silicon carbon composite powder 311 having the physical properties and characteristics described herein. Step 311 may comprise any commonly used technique for particle sizing, categorization and quality control including, for example, sieve analysis, digital image particle processing, light scattering (dynamic light scattering), static laser light analysis (laser diffraction), acoustic spectroscopy, and the like.

At this stage, the process provides an electrochemically active silicon carbon composite powder that can be readily incorporated into conventional electrode manufacturing processes 313. In example embodiments, the silicon carbon composite powder may be deposited on a collector in a manner similar to those used in processes for making a conventional electrode structure (e.g., graphite electrodes, as known in the industry). In further example embodiments, an electrode in a battery or electrochemical cell can include a silicon carbon composite powder described herein. For example, the silicon carbon composite powder can be used for the anode and/or cathode. In some example embodiments, the battery is a lithium ion battery. Additional example embodiments of electrode and battery formation are described below.

Incorporating the Silicon Carbon Composite Powder into Electrodes.

Figure 4:
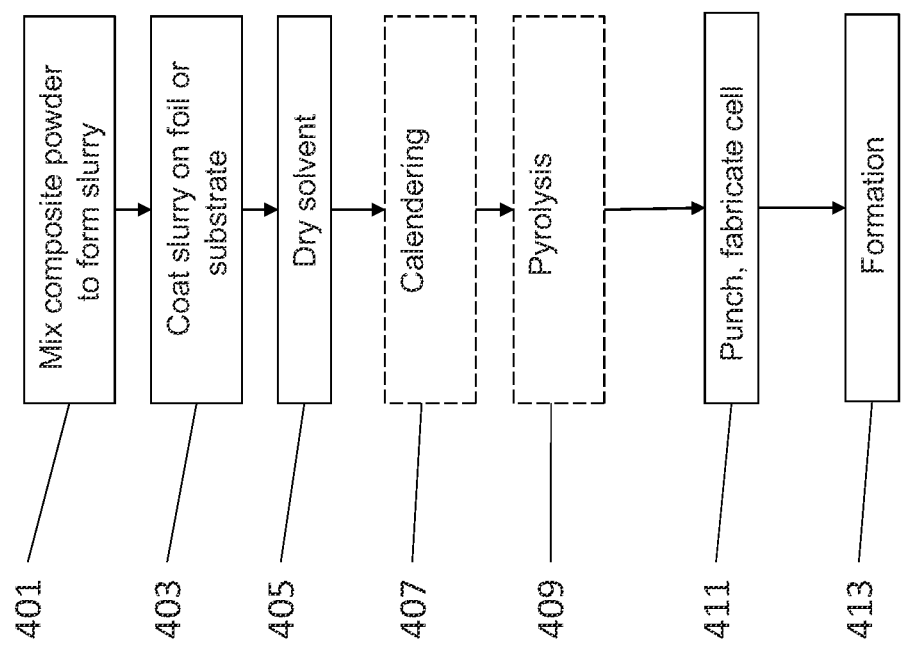
FIG. 4 is a flow diagram of a process for further processing silicon carbon composite powder for direct coating electrodes, in accordance with an example embodiment of the disclosure.
Figure 5:
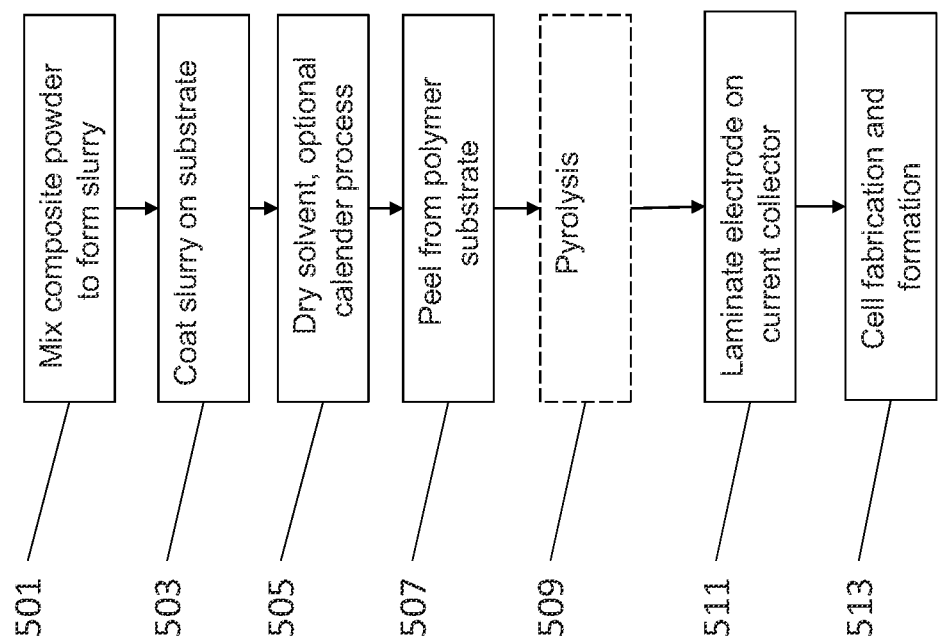
FIG. 5 is a flow diagram for further alternative process that further processes the silicon carbon composite powder for lamination of electrodes, in accordance with an example embodiment of the disclosure.

In each of the example embodiments illustrated in FIG. 4 and FIG. 5 a process method is described that may incorporate the silicon carbon composite powder particles prepared in accordance with the disclosure into standard processes for forming an electrode.

This process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PAA, PI and mixtures and combinations thereof. Another example process comprising forming the active material on a substrate and then transferring to the current collector is described with respect to FIG. 5.

In illustrative FIG. 4, step 401, the silicon carbon composite powder may be mixed using a binder/resin (such as PI, PAI), solvent, and conductive carbon. For example, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon carbon composite powder with a desired particle size, may then be dispersed in polyamic acid resin (15% solids in N-Methyl pyrrolidone (NMP)) at, e.g., 800-1200 rpm in a ball miller for a designated time, and then the conjugated carbon/NMP slurry may be added and dispersed at, e.g., 2000 rpm for, e.g., another predefined time to achieve a slurry viscosity within 2000-4000 cP and a total solid content of about 30%. The particle size and mixing times may be varied to configure the active material density and/or roughness.

In step 403, the slurry may be coated on a substrate or a foil at a loading of, e.g., 3-4 mg/cm$^2$, which may undergo drying in step 405 resulting in less than 15% residual solvent content. In step 407, an optional calendering process may be utilized where a series of hard pressure rollers may be used to finish the film/substrate into a smoother and denser sheet of material.

While an optional pyrolysis step 409, may be included, pyrolysis is not necessary as the silicon carbon composite powder is provided as pyrolyzed material. The process may result in an anode active material having silicon content greater than or equal to 50% by weight, where the anode has been subjected to heating at or above 400° C. Any final heat treatment step (e.g., heating at or above 400° C.) can be done either in roll form or after punching in step 411. If done in roll form, the punching may be preferably done after the final heat treatment. The punched electrode may then be sandwiched with a separator and cathode with electrolyte to form a cell. In step 413, the cell may be subjected to a formation process, comprising initial charge and discharge steps to lithiate the anode, with some residual lithium remaining.

FIG. 5 is a flow diagram of an alternative process for lamination of electrodes, in accordance with an example embodiment of the disclosure. While the previous process to fabricate composite anodes employs a direct coating process, this process physically mixes the silicon carbon composite powder, conductive additive, and binder together coupled with peeling and lamination processes.

This process is shown in the flow diagram of FIG. 5, starting with step 501 where the silicon carbon composite powder may be mixed with a binder/resin such as polyimide (PI) or polyamide-imide (PAI), solvent, the silosilazane additive, and optionally a conductive carbon. As with the process described in FIG. 4, graphene/VGCF (1:1 by weight) may be dispersed in NMP under sonication for, e.g., 45-75 minutes followed by the addition of Super P (1:1:1 with VGCF and graphene) and additional sonication for, e.g., 1 hour. Silicon carbon composite powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 503, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 15% solvent content), and then dried to remove a portion of the solvent in step 505. An optional calendering process may be utilized where a series of hard pressure rollers may be used to finish the film/substrate into a smoothed and denser sheet of material.

In step 507, the green film may then be removed from the PET, where the active material may be peeled off the polymer substrate. The peeling may be followed by a cure and an optional pyrolysis step 509. Pyrolysis is not necessary as the silicon carbon composite powder is provided as pyrolyzed material. The process may provide an anode active material having silicon content greater than or equal to 50% by weight, where the anode has been subjected to heating at or above 400° C.

In step 511, the material may be flat press or roll press laminated on the current collector, where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the material may be roll-press laminated to the current collector.

In step 513, the electrode may then be sandwiched with a separator and cathode with electrolyte to form a cell. The cell may be subjected to a formation process, comprising initial charge and discharge steps to lithiate the anode, with some residual lithium remaining.

In an example embodiment of the disclosure, a method and system are provided for a silicon carbon composite powder comprising silicon and pyrolyzed carbon, where the composite powder has a $D_{50}$ particle size distribution range of less than about 25 um, or about 5 um to about 15 um. In some example embodiments, the silicon carbon composite powder may further comprise graphite or other conductive carbon particles. In example embodiments, the $D_{50}$ particle size distribution range of the composite powder may be substantially the same as the $D_{50}$ size distribution of a graphite particles selected from a commercially available graphite. In yet further example embodiments the silicon carbon composite powder may comprise particles having a distinct $D_{50}$ particle size distribution relative to other particles included in the composite powder (e.g., a bimodal or multimodal particle size distribution). In such example embodiments, the differences in particle size can allow for the modification of the packing density and/or porosity of a material (e.g., an electrode active material) that may be used to modify the properties of the composite material (e.g., for high power applications).

In further example embodiments, the silicon carbon composite powder comprises about 70-96% (by weight) silicon particles and an amount of pyrolyzed carbon derived from a precursor polymer. In some further example embodiments the silicon carbon composite powder may comprise about 75-90% (by weight) silicon particles. In yet further example embodiments, the silicon carbon composite powder may further comprise about 5-15% (by weight) graphite or other conductive carbon particles. In some example embodiments, the silicon carbon composite powder may comprise pyrolytic carbon in a weight percent amount that is sufficient make up (to 100%) the shortfall in the weight percent of silicon, or in the combined weight percent of silicon and graphite particles, included in the composite powder. In further example embodiments, the amount of the pyrolytic carbon in the silicon carbon composite powder may be substantially located at or near the surface of the particles, so that it limits the surface exposure of the silicon particles in the composite material. In such example embodiments the presence of the pyrolytic carbon provides a particular advantage in that its location at the particle surface prevents the formation of a solid electrolyte interphase (SEI) layer by limiting or preventing chemical reaction between the silicon and any electrolyte that may be present and in contact with the composite powder (e.g., in an anode or a battery cell).

In example embodiments, the silicon carbon composite powder may be produced and generated using any of the processing methods described herein. For example, the silicon particles and the graphite particles may be mixed together in the weight percent ranges disclosed herein and can be combined with standard binders or precursor polymers. Some example embodiments of binders or precursor polymers include the non-limiting examples of CMC (carboxymethyl cellulose), SBR (styrene-butadiene rubber), Sodium Alginate, PI (polyimide), PAI (polyamide-imide), PAA (polyacrylic acid), and the like, as well as mixtures and combinations thereof. As discussed herein, the pyrolysis of such binders and/or precursor polymers (e.g., at process temperatures that may range from about 600-1500° C., or about 800-1200° C.) can be effective to convert those materials to the pyrolytic carbon that may comprise a portion of the silicon carbon composite powder described herein.

In some example embodiments the silicon carbon composite powder comprises graphite or other conductive carbon (e.g., carbon blacks, carbon fibers, carbon nanofibers, carbon nanotubes, etc.) particles having a $D_{50}$ size distribution of about 0.1 um to about 1.0 um. In some further example embodiments the graphite particles have a $D_{50}$ size distribution of about 0.1 um to less than 1.0 um, or about 0.1 um to about 0.9 um, about 0.1 um to about 0.8 um, about 0.1 um to about 0.7 um, or about 0.1 um to about 0.6 um. In yet further example embodiments, the graphite particles have a $D_{50}$ size distribution of about 0.1 um to about 0.7 um. In example embodiments, graphite or other conductive carbon (e.g., carbon blacks, carbon fibers, carbon nanofibers, carbon nanotubes, etc.) particles having the $D_{50}$ size distributions described herein may be produced from larger graphite particles using known processing techniques (e.g., milling, and the like).

In some example embodiments the silicon carbon composite powder comprises silicon particles having a $D_{50}$ size distribution of about 0.1 um to about 1.0 um. In some further example embodiments the silicon particles have a $D_{50}$ size distribution of about 0.1 um to less than 1.0 um, or about 0.1 um to about 0.9 um, about 0.1 um to about 0.8 um, about 0.1 um to about 0.7 um, or about 0.1 um to about 0.6 um. In yet further example embodiments, the silicon particles have a $D_{50}$ size distribution of about 0.1 um to about 0.7 um. In example embodiments, and much like the graphite particles described above, silicon particles having the $D_{50}$ size distributions described herein may be produced from larger silicon particles using known processing techniques (e.g., milling, and the like).

In yet further example embodiments, the silicon particles can include trace amounts of contaminants, or dopant, such that the presence of the trace material may make the silicon particles conductive (or semi-conductive). Some non-limiting example embodiments of such silicon particles include highly doped N-type silicon, and silicon that includes trace elements such as, for example, aluminum, boron, or phosphorus, or combinations thereof as a dopant. In some example embodiments the silicon particles may comprise a native oxide layer (e.g., as $SiO_2$); however in typical embodiments the silicon is substantially free of any amount of added silicon oxide (e.g., $SiO_2$), in order to avoid potential early stage cell reaction that may create irreversible loss of capacity in the cell.

In some example embodiments, the disclosure provides electrodes, such as silicon carbon composite and silicon dominant anodes that comprise the silicon carbon composite powder described herein.

In yet further example embodiments, the disclosure provides a battery that comprises the silicon carbon composite powder described herein.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A silicon carbon composite powder comprising:
   (1) about 70-96% (by weight) silicon particles, wherein the silicon particles have a D50 size distribution of about 0.1 µm to about 1.0 µm;
   (2) pyrolyzed carbon derived from a precursor polymer, which coats the surface of each of the individual silicon particles, and limits the surface exposure of the silicon particles; and
   (3) about 5-15% (by weight) graphite or other conductive carbon particles, wherein the graphite or other conductive carbon particles have a D50 size distribution of about 0.1 µm to about 1.0 µm;
   wherein said precursor polymer is selected from the group consisting of CMC (carboxymethyl cellulose); SBR (styrene-butadiene rubber); Sodium Alginate; PI (polyimide); PAI (polyamide-imide); PAA (polyacrylic acid); and mixtures thereof; and
   wherein the silicon carbon composite powder particles have a D50 size distribution in a range of about 5 µm to about 15 µm.

2. The silicon carbon composite powder according to claim 1, wherein the silicon particles include an amount of contaminants sufficient to provide the silicon particles with an amount of conductivity.

3. The silicon carbon composite powder according to claim 1, wherein said silicon carbon composite powder comprises about 75-90% (by weight) silicon particles.

4. A battery, the battery comprising:
   one or more anodes, one or more cathodes, one or more current collectors and one or more electrolytes;
   wherein said one or more anodes comprise a silicon carbon composite powder comprising:
   (1) about 70-96% (by weight) silicon particles, wherein the silicon particles have a D50 size distribution of about 0.1 µm to about 1.0 µm;
   (2) pyrolyzed carbon derived from a precursor polymer, which coats the surface of each of the individual silicon particles, and limits the surface exposure of the silicon particles; and
   (3) about 5-15% (by weight) graphite or other conductive carbon particles, wherein the graphite or other conductive carbon particles have a D50 size distribution of about 0.1 µm to about 1.0 µm;
   wherein said precursor polymer is selected from the group consisting of CMC (carboxymethyl cellulose); SBR (styrene-butadiene rubber); Sodium Alginate; PI (polyimide); PAI (polyamide-imide); PAA (polyacrylic acid); and mixtures thereof; and
   wherein the silicon carbon composite powder particles have a D50 size distribution in a range of about 5 um to about 15 um.

5. The battery according to claim 4, wherein the silicon particles include an amount of contaminants sufficient to provide the silicon particles with an amount of conductivity.

6. The battery according to claim 4, wherein said silicon carbon composite powder comprises about 75-90% (by weight) silicon particles.

7. The battery according to claim 4, wherein the pyrolytic carbon at the surface of the silicon carbon composite powder particles prevents the formation of a solid electrolyte interphase (SEI) layer by limiting or preventing chemical reaction between the silicon and the electrolyte.

8. An electrode, the electrode comprising:
   a silicon carbon composite powder comprising:
   (1) about 70-96% (by weight) silicon particles, wherein the silicon particles have a D50 size distribution of about 0.1 µm to about 1.0 µm;
   (2) pyrolyzed carbon derived from a precursor polymer, which coats the surface of each of the individual silicon particles, and limits the surface exposure of the silicon particles; and
   (3) about 5-15% (by weight) graphite or other conductive carbon particles, wherein the graphite or other conductive carbon particles have a D50 size distribution of about 0.1 µm to about 1.0 µm;
   wherein said precursor polymer is selected from the group consisting of CMC (carboxymethyl cellulose); SBR (styrene-butadiene rubber); Sodium Alginate; PI (polyimide); PAI (polyamide-imide); PAA (polyacrylic acid); and mixtures thereof; and
   wherein the silicon carbon composite powder particles have a D50 size distribution in a range of about 5 µm to about 15 µm.

9. The electrode according to claim 8, wherein the silicon particles include an amount of contaminants sufficient to provide the silicon particles with an amount of conductivity.

10. The electrode according to claim 8, wherein said silicon carbon composite powder comprises about 75-90% (by weight) silicon particles.

11. The electrode according to claim 8, wherein the pyrolytic carbon at the surface of the silicon carbon composite powder particles prevents the formation of a solid electrolyte interphase (SEI) layer by limiting or preventing chemical reaction between the silicon and the electrolyte.

\* \* \* \* \*